(12) United States Patent
Maekawa et al.

(10) Patent No.: US 11,429,728 B2
(45) Date of Patent: Aug. 30, 2022

(54) VULNERABILITY EVALUATION APPARATUS

(71) Applicant: Yazaki Corporation, Tokyo (JP)

(72) Inventors: Yosuke Maekawa, Susono (JP); Shigeki Sano, Susono (JP); Hiroaki Saji, Susono (JP); Yoichi Komatsu, Susono (JP); Yutaro Enomoto, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 103 days.

(21) Appl. No.: 17/073,911

(22) Filed: Oct. 19, 2020

(65) Prior Publication Data
US 2021/0117551 A1  Apr. 22, 2021

(30) Foreign Application Priority Data

Oct. 21, 2019 (JP) .............................. JP2019-191874

(51) Int. Cl.
  *G06F 21/57* (2013.01)
  *G06F 21/55* (2013.01)
  *G06F 21/56* (2013.01)
(52) U.S. Cl.
  CPC .......... *G06F 21/577* (2013.01); *G06F 21/554* (2013.01); *G06F 21/565* (2013.01); *G06F 21/567* (2013.01); *G06F 21/568* (2013.01)
(58) Field of Classification Search
  CPC .... G06F 21/577; G06F 21/565; G06F 21/554; G06F 21/567; G06F 21/568
(Continued)

(56) References Cited

U.S. PATENT DOCUMENTS

| 7,530,104 | B1 * | 5/2009 | Thrower | ............. | H04L 63/1433 |
| | | | | | 713/188 |
| 2007/0094735 | A1 | 4/2007 | Cohen et al. | | |

(Continued)

FOREIGN PATENT DOCUMENTS

| EP | 3 512 176 A1 | 7/2019 |
| JP | 2014-174577 A | 9/2014 |

(Continued)

OTHER PUBLICATIONS

Google scholar results attached (Year: 2022).*

*Primary Examiner* — Michael S McNally
(74) *Attorney, Agent, or Firm* — Sughrue Mion, PLLC

(57) ABSTRACT

A vulnerability evaluation apparatus includes an input unit configured to input a source code of a program to be evaluated, information indicating assets which are desired to be preserved and an attack accomplishment condition where the assets are not preserved, information indicating an attack determination position at which whether the condition where the assets are not preserved is satisfied can be determined, and input information for the program, an input position designating unit configured to designate an input position indicating a position at which the input information for the program is input, an attack determination position designating unit configured to designate the attack determination position, and an attack path analyzing unit configured to analyze a path from the attack determination position to the input position and specify an attack path where the attack accomplishment condition is satisfied.

10 Claims, 9 Drawing Sheets

(58) Field of Classification Search
USPC ............................................................ 726/25
See application file for complete search history.

(56) References Cited

U.S. PATENT DOCUMENTS

| | | |
|---|---|---|
| 2008/0098479 A1 | 4/2008 | O'Rourke et al. |
| 2009/0077666 A1 | 3/2009 | Chen et al. |
| 2021/0273952 A1* | 9/2021 | Ishihara .............. H04L 63/1416 |

FOREIGN PATENT DOCUMENTS

| | | | | |
|---|---|---|---|---|
| JP | 2014174577 A | * | 9/2014 | |
| JP | 2018-156159 A | | 10/2018 | |
| WO | WO-2015137235 A1 | * | 9/2015 | ........... G06F 21/554 |

* cited by examiner

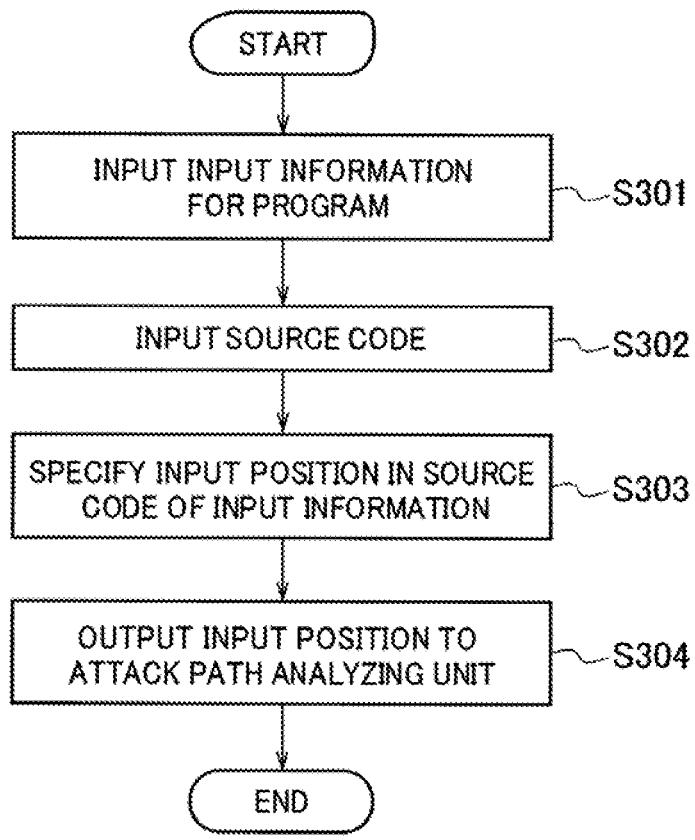
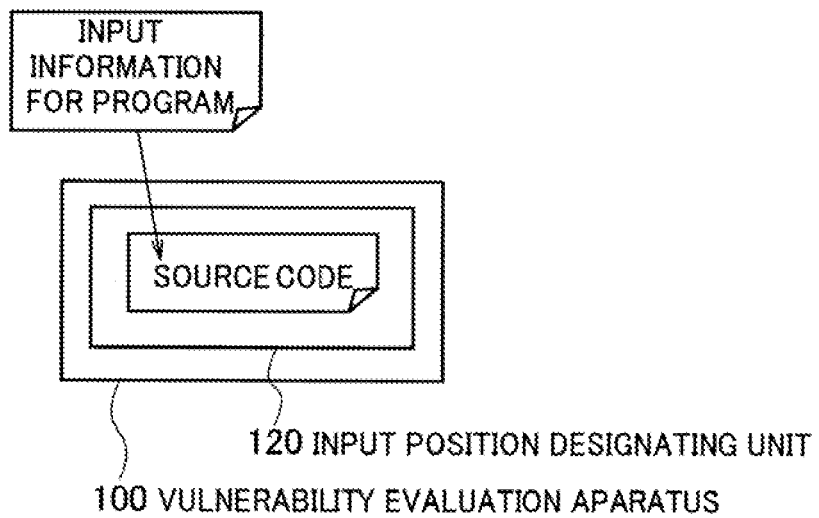

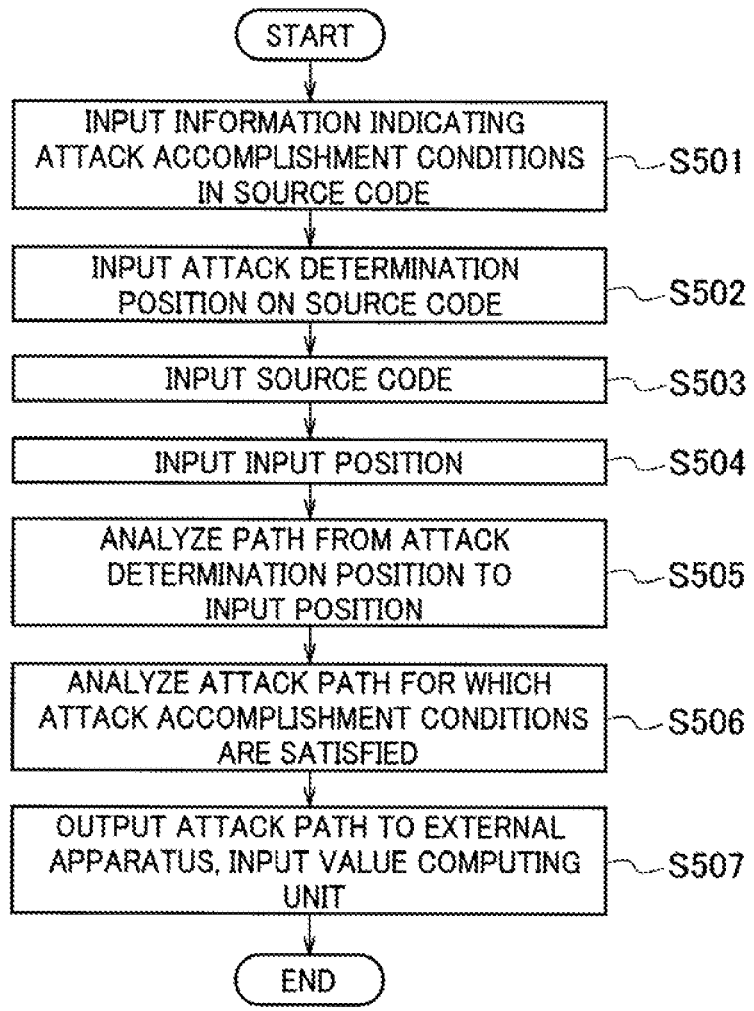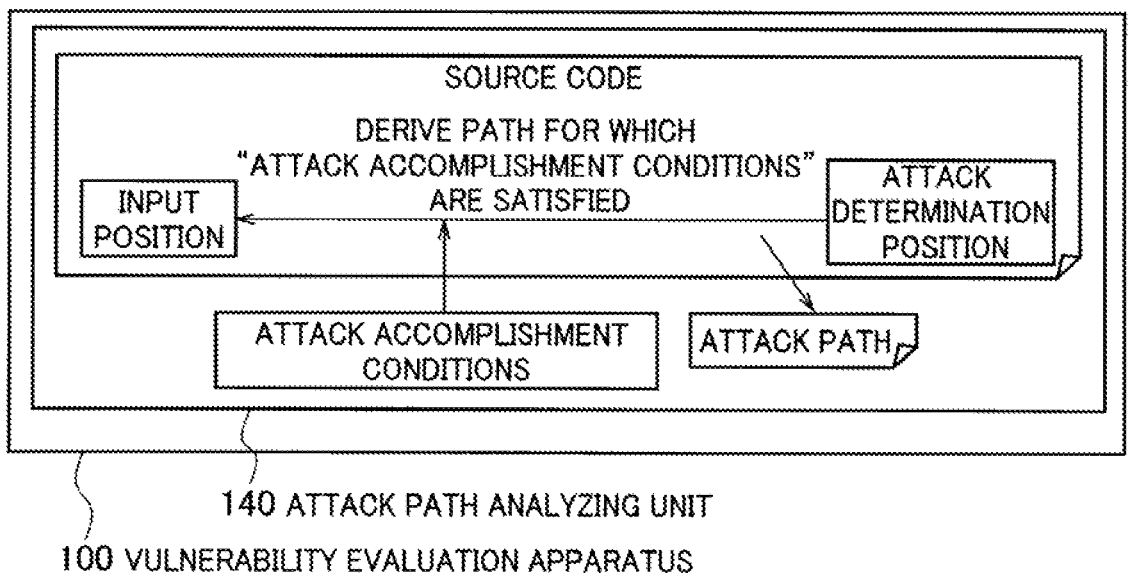

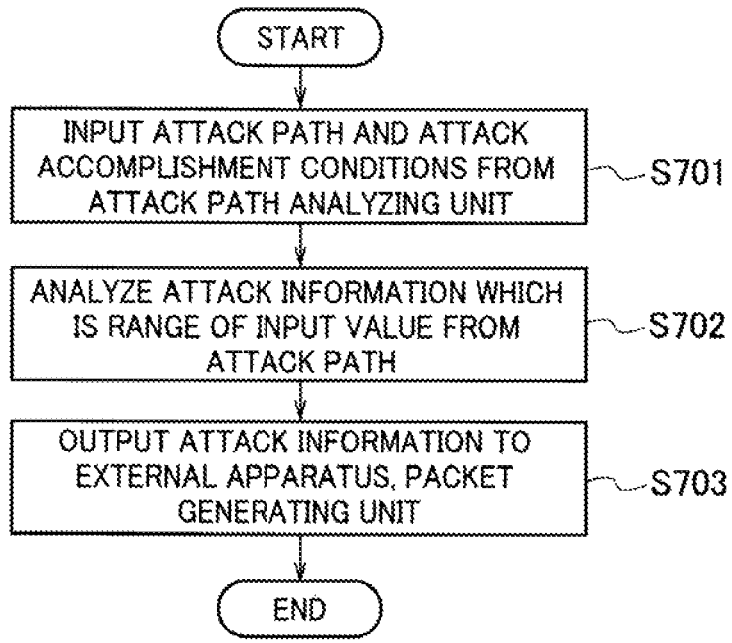
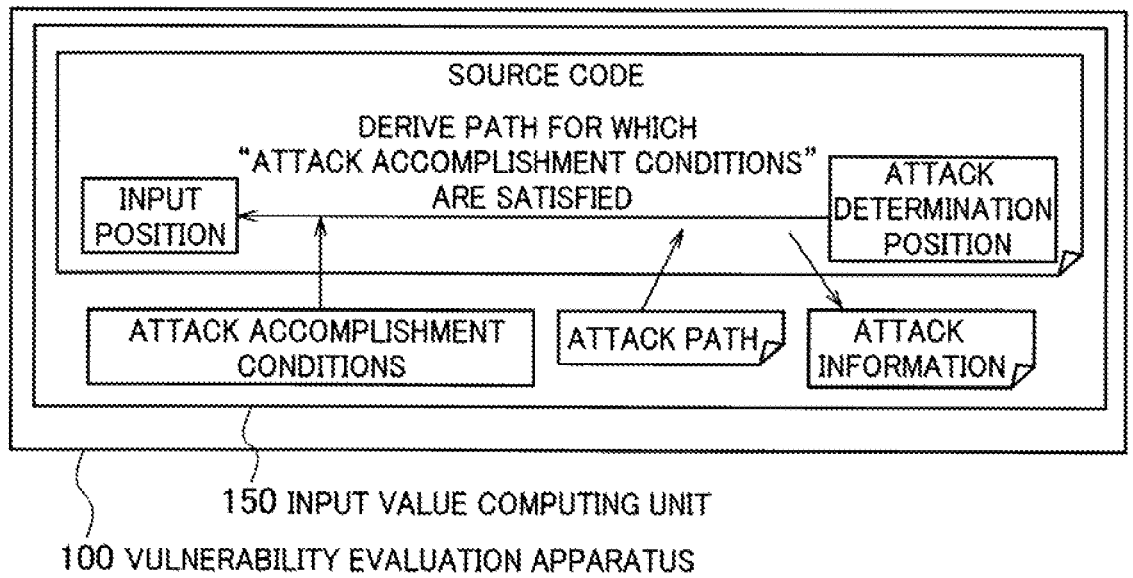

VULNERABILITY EVALUATION APPARATUS

CROSS-REFERENCE TO RELATED APPLICATIONS

The present application is based on, and claims priority from Japanese Patent Application No. 2019-191874, filed on Oct. 21, 2019, the entire contents of which are incorporated herein by reference.

TECHNICAL FIELD

The disclosure relates to a vulnerability evaluation apparatus that evaluates vulnerability in a program.

BACKGROUND

In related art, there has been a method for detecting vulnerability in terms of security, which exists in a program incorporated into a computer, and a detection method disclosed in JP 2018-156159 A has been proposed.

JP 2018-156159 A discloses respective components such as a transition analyzing unit, an enemy state calculating unit, a cooperator state calculating unit and a disadvantageous state calculating unit as means for detecting vulnerability. The transition analyzing unit executes transition analysis processing of analyzing a program to be evaluated to obtain transition relationship between states. In this event, transition occurred by a cooperator is distinguished from transition occurred by an enemy in accordance with a user type of a user who has invoked a function. Then, reachability is determined. Input by the enemy, the number of times of which is arbitrary, can be interrupted before and after input by the cooperator. Whether or not a state reaches a state where evaluation conditions are not satisfied is determined by alternately using transition relationship of the enemy and transition relationship of the cooperator which are distinguished from each other. In this manner, the respective components calculate a state or an aggregate of states which is to be output from input conditions and states.

SUMMARY

However, according to disclosure of the above-described related art, even if conditions in an actual program are indicated, due to an enormous amount of calculation being required for calculating an aggregate of states, it is not realistic to detect vulnerability in terms of security. In other words, there has been an issue that a specific method for confirming whether or not there is a possibility that a program may reach a specific inconvenient state due to unauthorized input is not provided. Therefore, the disclosure is directed to providing means for solving such an issue.

A vulnerability evaluation apparatus which evaluates whether or not there is vulnerability in terms of information security of a program which is to be evaluated according to some embodiments, includes an input unit that inputs a source code of the program which is to be evaluated, information indicating assets which are desired to be preserved and an attack accomplishment condition which is a condition where the assets which are desired to be preserved are not preserved, information indicating an attack determination position which is a position at which whether the condition where the assets which are desired to be preserved are not preserved is satisfied can be determined, and input information for the program, which are indicated using a notation method of the source code; an input position designating unit that designates an input position indicating a position at which the input information for the program is input in the source code; an attack determination position designating unit that designates the attack determination position at which whether the condition where the assets which are desired to be preserved are not preserved is satisfied can be determined, in the source code from the information indicating the attack determination position; and an attack path analyzing unit that analyzes a path from the attack determination position to the input position in the source code and specify an attack path which is a path for which the attack accomplishment condition is satisfied from the path through specific processing at the attack determination position.

The information indicating the attack determination position at which whether the condition where the assets which are desired to be preserved are not preserved is satisfied can be determined, may include information indicating specific processing indicated using the notation method of the source code and information indicating a position at which the specific processing is to be executed.

The specific processing may include at least one of processing of rewriting the assets which are desired to be preserved, or processing of making the assets which are desired to be preserved accessible from outside of an electronic apparatus at which the program is implemented.

The input information for the program may be information which directly or indirectly indicates information to be used for establishing the attack path, indicated using the notation method of the source code.

The vulnerability evaluation apparatus may further includes an input value computing unit that calculates information expressing a value of input information to be input to the program or a range of the value, which is to be utilized for establishing the attack path, as attack information.

The input value computing unit may calculate information which satisfies a branch condition for establishing the attack path as the attack information in branch processing of the attack path.

The vulnerability evaluation apparatus may further include a packet generating unit that converts a format of the attack information into a format which complies with communication protocol to be used at an electronic apparatus at which the program which is to be evaluated is implemented and generate a communication packet which includes the converted attack information and which can be transmitted to the electronic apparatus.

The vulnerability evaluation apparatus may further include a source code structure analyzing unit that analyzes the source code of the program which is to be evaluated and express processing procedure and processing content of processing indicated by the source code with a logical model.

The logical model may be a control flow graph or an abstract syntax tree.

The attack determination position designating unit may designate the attack determination position on a path of the logical model, the input position designating unit may designate the input position on a path of the logical model, and the attack path analyzing unit may specify the attack accomplishment condition in processing of the logical model.

According to the configuration described above, it becomes possible to provide a specific method for confirm-

BRIEF DESCRIPTION OF DRAWINGS

FIG. 3A is a view illustrating an example of processing of an input position designating unit according to the embodiment; FIG. 3B is a schematic diagram illustrating part of the processing of the input position designating unit according to the embodiment;

FIG. 5A is a view illustrating an example of processing of an attack path analyzing unit according to the embodiment; FIG. 5B is a schematic diagram illustrating part of the processing of the attack path analyzing unit according to the embodiment;

FIG. 7A is a view illustrating an example of processing of an input value computing unit according to the embodiment; FIG. 7B is a schematic diagram illustrating part of the processing of the input value computing unit according to the embodiment;

DETAILED DESCRIPTION

Various embodiments will be described hereinafter with reference to the accompanying drawings.

(Outline of Vulnerability Evaluation Apparatus)

Figure 1:
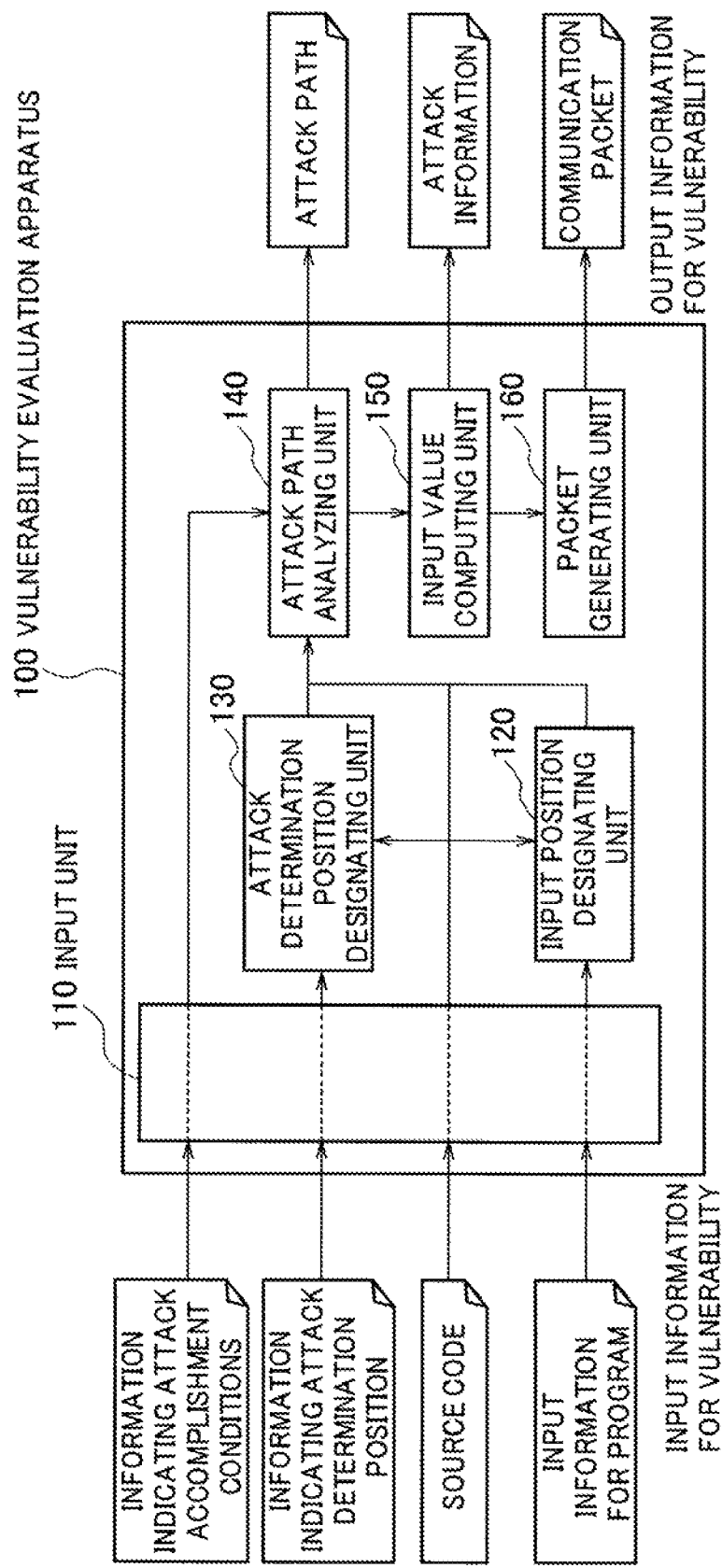
FIG. 1 is a view illustrating an example of a configuration of a vulnerability evaluation apparatus according to the present embodiment.

FIG. 1 illustrates an example of a vulnerability evaluation apparatus 100 according to the present embodiment, which determines whether or not there is a possibility that a program which is to be implemented at an electronic apparatus for which input information is limited, and which is to be evaluated, may reach a specific inconvenient state due to unauthorized input information. The vulnerability evaluation apparatus 100 includes an input unit 110, an input position designating unit 120, an attack determination position designating unit 130, an attack path analyzing unit 140, an input value computing unit 150, and a packet generating unit 160. With the above-described components included in the vulnerability evaluation apparatus 100, a path which logically connects a position at which the input information is accepted and a position at which whether an attack against the program is accomplished can be determined in a source code of the program to be evaluated is analyzed and derived. The vulnerability evaluation apparatus 100 calculates an attack path which is actually effective and an input value with which the attack path is established from the derived path. Further, the vulnerability evaluation apparatus 100 generates a test pattern for executing a test which is effective and reliable for an electronic apparatus which is an arbitrary evaluation target for which it is desired to perform evaluation in terms of information security. Note that there is a case where the vulnerability evaluation apparatus 100 includes a source code structure analyzing unit 170 illustrated in FIG. 9.

Examples of the input information for vulnerability evaluation which is to be input to the vulnerability evaluation apparatus 100 that executes the above-described processing can include a source code of the program to be evaluated, information indicating attack accomplishment conditions and information indicating an attack determination position which are designated in the source code. Further, examples of the input information for vulnerability evaluation which is to be input to the vulnerability evaluation apparatus 100 can also include input information for the program to be evaluated. The information indicating the attack accomplishment conditions is information designating conditions where assets which a user tries to preserve are not preserved in expression on the source code. The information indicating the attack determination position is information indicating a position at which the attack accomplishment conditions should be determined on the source code, and, if the attack accomplishment conditions are satisfied, is a position at which processing is described through which the assets which the user tries to preserve are not preserved. The input information for the program which is to be evaluated is a variable, or the like, which expresses branch conditions in branch processing of selecting a path on the source code. A position at which a value is input to the variable, or the like, which expresses the branch conditions is an input position designated by the input position designating unit 120.

Examples of output information for vulnerability evaluation which is to be output from the vulnerability evaluation apparatus 100 can include an attack path, attack information, and a communication packet. The attack path is information indicating a path in a case where an attack against the program is accomplished in processing flow in the program to be evaluated. The attack information is an input value at the input position in the program, at which the input information for the program is stored and is information which enables tracing of the attack path. Examples of the attack information can include a numerical value of the variable or a numerical range of the variable. The communication packet includes the attack information and is information which is input via an interface provided at an electronic apparatus at which the program which is to be evaluated is implemented.

The input unit 110, the input position designating unit 120, the attack determination position designating unit 130, the attack path analyzing unit 140, the input value computing unit 150, the packet generating unit 160, and the source code structure analyzing unit 170 included in the vulnerability evaluation apparatus 100 will be described in detail next.

Figure 2A:
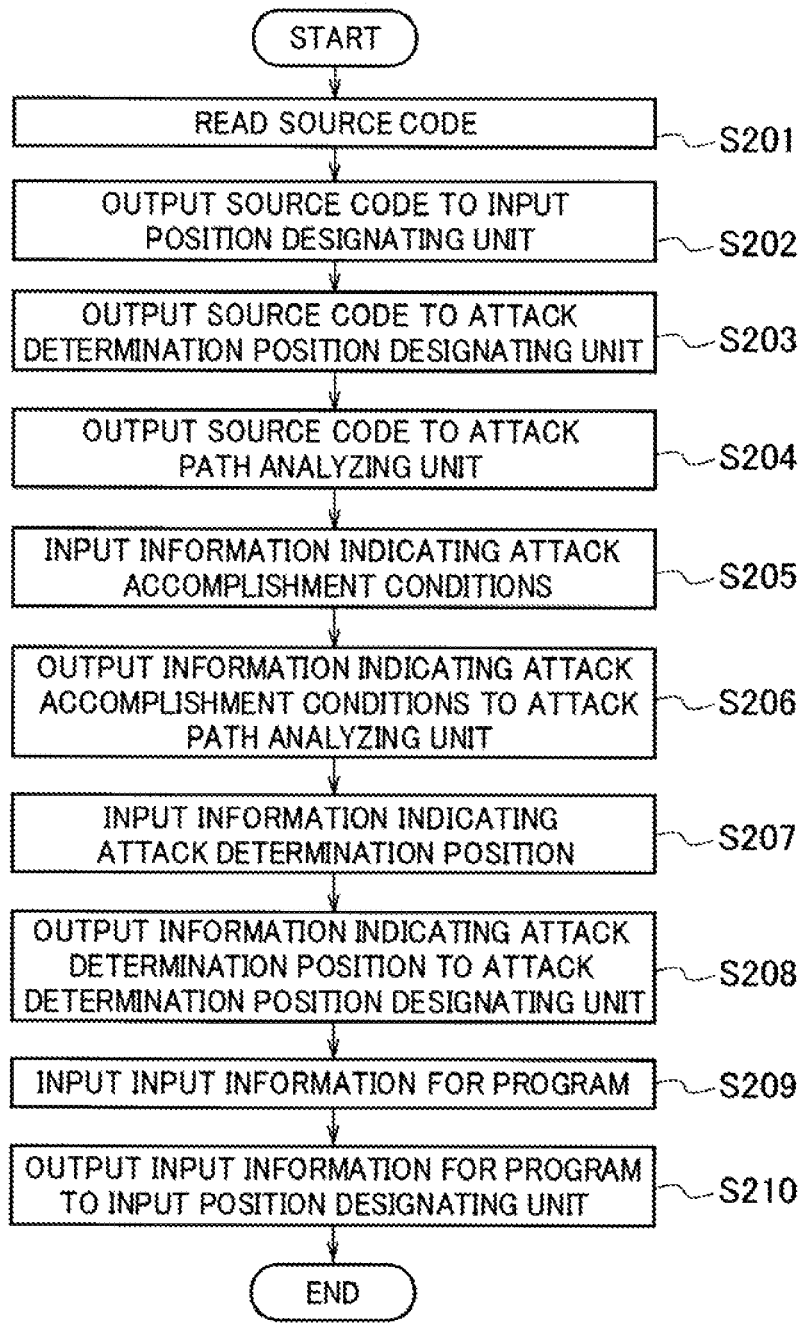
FIG. 2A is a view illustrating an example of processing of an input unit according to the embodiment.
Figure 2B:
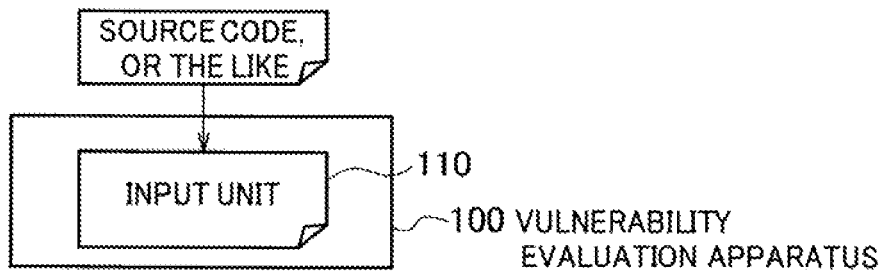
FIG. 2B is a schematic diagram illustrating part of the processing of the input unit according to the embodiment.

FIG. 2A illustrates an example of processing flow of the input unit 110, and FIG. 2B illustrates a schematic diagram of part of the processing flow of the input unit 110.

The input unit 110, which is an arbitrary interface which is not illustrated, has a function of inputting/outputting various kinds of information.

In step S201 in FIG. 2A, the input unit 110 reads the source code of the program which is to be evaluated via an interface which is not illustrated. Processing order of the following step S202 to step S204 is not limited to the present embodiment, and the processing from step S202 to step S204 can be implemented by the input unit 110 in arbitrary order.

In step S202, the input unit 110 outputs the source code to the input position designating unit 120. In step S203, the input unit 110 outputs the source code to the attack determination position designating unit 130. In step S204, the input unit 110 outputs the source code to the attack path analyzing unit 140.

In step S205, the input unit 110 inputs the information indicating the attack accomplishment conditions via an interface which is not illustrated. In step S206, the input unit 110 outputs the information indicating the attack accomplishment conditions to the attack path analyzing unit 140.

In step S207, the input unit 110 inputs the information indicating the attack determination position via an interface which is not illustrated. In step S208, the input unit 110 outputs the information indicating the attack determination position to the attack determination position designating unit 130. Note that, in step S208, in a case where the information indicating the attack determination position directly indicates the attack determination position in the source code, there is also a case where the input unit 110 outputs the information indicating the attack determination position to the attack path analyzing unit 140.

In step S209, the input unit 110 inputs the input information for the program via an interface which is not illustrated. In step S210, the input unit 110 outputs the input information for the program to the input position designating unit 120.

Note that processing order of inputting various kinds of information in the above-described step S201, step S205, step S207, and step S209 is not limited to the present embodiment, and the processing can be implemented by the input unit 110 in arbitrary order.

FIG. 2B illustrates a schematic diagram of operation in which the input unit 110 inputs information such as the source code of the program which is an evaluation target, which is to be evaluated in terms of information security, via an arbitrary interface which is not illustrated. By this means, it is possible to incorporate logic for realizing functions which are to be realized by the evaluation target.

FIG. 3A illustrates an example of processing flow of the input position designating unit 120, and FIG. 3B illustrates a schematic diagram of part of the processing flow of the input position designating unit 120.

In step S301 in FIG. 3A, the input position designating unit 120 receives input of the input information for the program which is to be evaluated from the input unit 110. In step S302, the input position designating unit 120 receives input of the source code of the program which is to be evaluated from the input unit 110. Note that processing order of the above-described step S301 and step S302 is not limited to the present embodiment, and the processing can be implemented by the input position designating unit 120 in arbitrary order.

In step S303, the input position designating unit 120 specifies a position on the source code of the program which is to be evaluated, at which information indicated by the input information input in step S301 is input. The position at which the information indicated by the input information is input will be referred to as an input position. By this means, it becomes possible to specify a position on the source code, at which input by an attacker against the program which is to be evaluated is performed.

In step S304, the input position designating unit 120 outputs the input position specified in step S303 to the attack path analyzing unit 140.

FIG. 3B illustrates a schematic diagram of operation in which the input position designating unit 120 receives input of the input information for the program which is an evaluation target and which is to be evaluated in terms of information security via the input unit 110 and specifies the input position on the source code. By this means, it becomes possible to specify a position on the source code, at which input by an attacker against the program which is to be evaluated is performed.

Figure 4A:
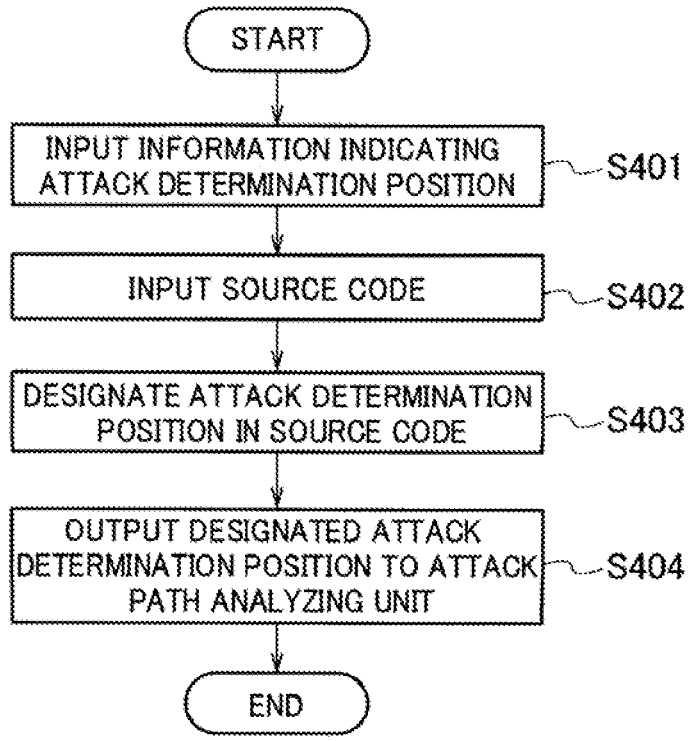
FIG. 4A is a view illustrating an example of processing of an attack determination position designating unit according to the embodiment.
Figure 4B:
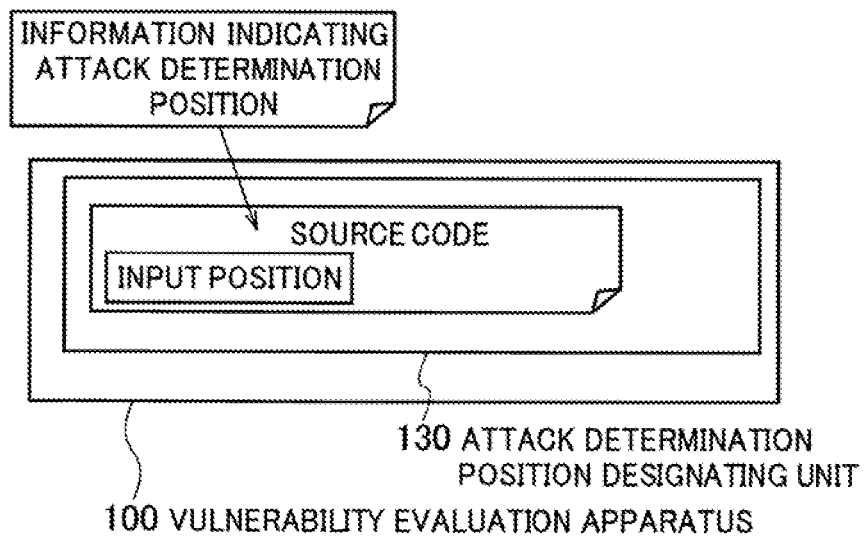
FIG. 4B is a schematic diagram illustrating part of the processing of the attack determination position designating unit according to the embodiment.

FIG. 4A illustrates an example of processing flow of the attack determination position designating unit 130, and FIG. 4B illustrates a schematic diagram of part of the processing flow of the attack determination position designating unit 130.

In step S401 in FIG. 4A, the attack determination position designating unit 130 receives input of information indicating the attack determination position of the program which is to be evaluated via the input unit 110. The information indicating the attack determination position is information for specifying a position at which determination can be made as to conditions where assets which are desired to be preserved cannot be preserved indicated in the attack accomplishment conditions.

In step S402, the attack determination position designating unit 130 receives input of the source code of the program which is to be evaluated from the input unit 110. Note that processing order of the above-described step S401 and step S402 is not limited to the present embodiment, and the processing can be implemented by the attack determination position designating unit 130 in arbitrary order.

In step S403, the attack determination position designating unit 130 designates the attack determination position on the source code from the information indicating the attack determination position.

In step S404, the attack determination position designating unit 130 outputs the attack determination position designated on the source code to the attack path analyzing unit 140.

FIG. 4B illustrates a schematic diagram of operation in which the attack determination position designating unit 130 designates the attack determination position on the source code. By this means, it becomes possible to determine that conditions reach the conditions where assets which are desired to be preserved cannot be preserved in the program which is to be evaluated.

FIG. 5A illustrates an example of processing flow of the attack path analyzing unit 140, and FIG. 5B illustrates a schematic diagram of part of the processing flow of the attack path analyzing unit 140.

In step S501, the attack path analyzing unit 140 receives input of information indicating the attack accomplishment conditions from the input unit 110. In step S502, the attack path analyzing unit 140 receives input of the attack determination position designated on the source code from the attack determination position designating unit 130. In step S503, the attack path analyzing unit 140 receives input of the source code from the input unit 110. In step S504, the attack path analyzing unit 140 receives input of the input position from the input position designating unit 120. Note that processing order of the above-described step S501 to step S504 is not limited to the present embodiment, and the processing from step S501 to step S504 can be implemented by the attack path analyzing unit 140 in arbitrary order.

In step S505, the attack path analyzing unit 140 specifies candidates for the attack path by executing analysis of tracing back the path on the source code from the attack determination position to the input position.

In step S506, the attack path analyzing unit 140 specifies the attack path by executing analysis of specifying a path for which the attack accomplishment conditions are satisfied from the candidates for the attack path. As described above, the attack path analyzing unit 140 retrospectively derives the path for which the attack accomplishment conditions are always satisfied on the source code from the attack determination position and executes analysis up to the input position. In this case, a case where the attack accomplishment conditions are always satisfied on the path from the attack determination position to the input position is synonymous with a state where input information for which the attack accomplishment conditions are satisfied exists. Therefore, the analyzed path for which the attack accomplishment conditions are always satisfied is an attack path to be used for an attack against assets which are desired to be preserved, and is a path through which vulnerability of the program is to be attacked. In this manner, the attack path analyzing unit 140 can reveal existence of an attack path through which vulnerability is to be attacked. Note that, to cope with attacks by a plurality of pieces of input information, the attack path analyzing unit 140 does not have to perform analysis so that analysis reaches the input position in one time in retrospective analysis, and can continue analysis up to a plurality of input positions in a case where analysis can be performed while paths are further traced back from the input position.

In step S507, the attack path analyzing unit 140 outputs the attack path to the input value computing unit 150. Note that, in step S507, the attack path analyzing unit 140 can also output the attack path to an external apparatus.

FIG. 5B illustrates a schematic diagram of operation in which the attack path analyzing unit 140 retrospectively derives the path for which the attack accomplishment conditions are always satisfied on the source code from the attack determination position and executes analysis up to the input position.

Figure 6:
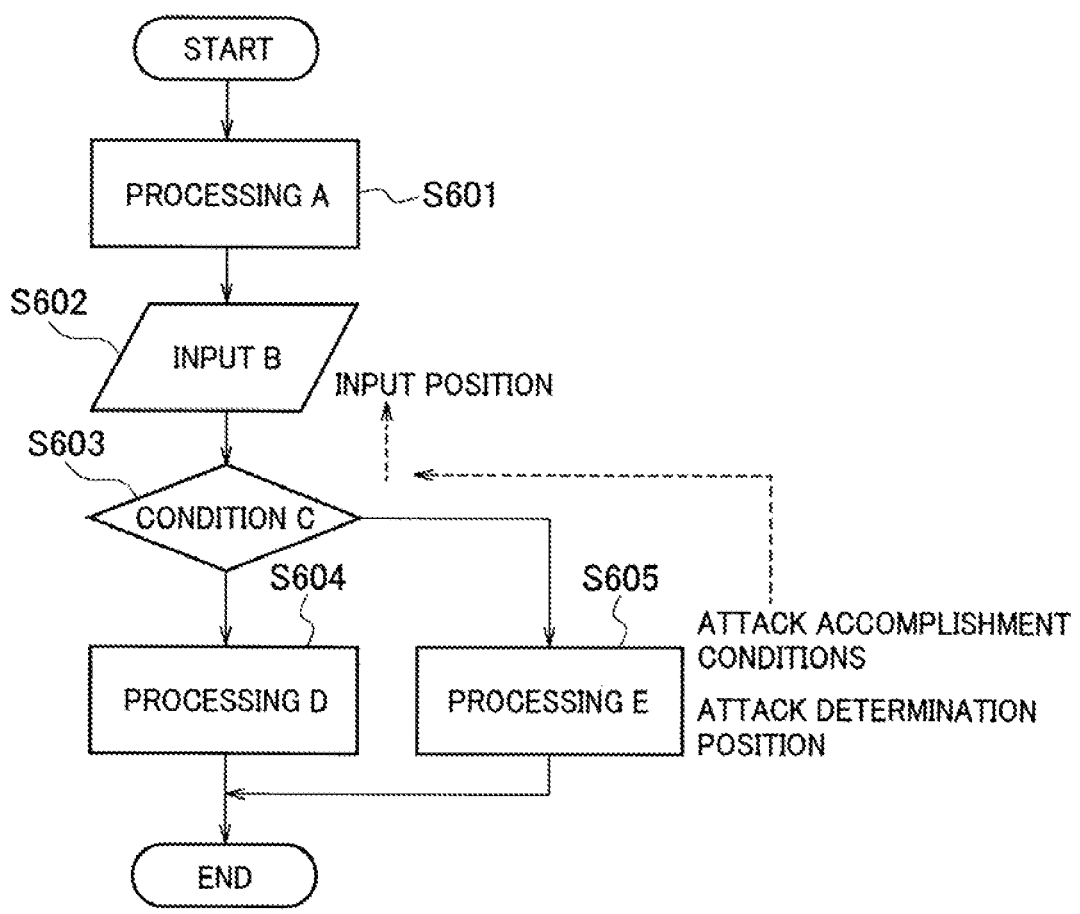
FIG. 6 is a view illustrating an example of a specific example of the processing of the attack path analyzing unit according to the embodiment.

FIG. 6 illustrates an example of a specific example of processing of the attack path analyzing unit 140, and is an example of operation in which the attack path analyzing unit 140 executes analysis of the attack path up to the input position while tracing back the path for which the attack accomplishment conditions are always satisfied on the source code from the attack determination position.

A position on the source code where "input B" (S602 of FIG. 6) exists is the input position designated by the input position designating unit 120. Further, information such as a variable input in "input B" as an example becomes information input to the input position designating unit 120 as the input information for the program. Further, the information such as a variable input in "input B" becomes information for judging branch conditions for judging branch of the path in "condition C" (S603 of FIG. 6), which braches into processing D (S604) and processing E (S605).

Further, a position on the source code at which "processing E" (S605 of FIG. 6) exists becomes the attack determination position designated by the attack determination position designating unit 130. Further, as an example, there is a case where information indicating the attack determination position input to the attack determination position designating unit 130 is "processing E" and position information of "processing E". Examples of "processing E" can include processing of rewriting specific information, processing of outputting specific information, or the like.

The attack path analyzing unit 140 analyzes paths from "processing E" to "input B" as candidates for the attack path. If the processing which satisfies the attack accomplishment conditions is processing of executing "processing E", in a case where a path for performing processing of executing "processing E" from "condition C" can be achieved by "input B", a path of "input B" > "condition C" > "processing E" becomes the attack path. Note that a range of a value with which branch conditions for establishing a path from "condition C" to "processing E" are satisfied becomes an example of the attack information to be computed by the input value computing unit 150. Therefore, for example, if the attack information is input in "input B", a path leading to "processing E" is always selected by "condition C", which results in execution of "processing E" which is processing that satisfies the attack accomplishment conditions. Further, there is a case where processing in a case where information such as a variable, which is to be processed in "processing E" indicates assets which are desired to be preserved corresponds to "processing E" which is processing that satisfies the attack accomplishment conditions. In this case, there is a case where the information indicating the attack accomplishment conditions becomes information indicating in the source code that the information such as a variable, which is to be processed indicates assets which are desired to be preserved. In a case where the information such as a variable, which is to be processed does not indicate assets which are desired to be preserved, the processing becomes processing which does not satisfy the attack accomplishment conditions.

FIG. 7A illustrates an example of processing flow of the input value computing unit 150, and FIG. 7B illustrates a schematic diagram of part of the processing flow of the input value computing unit 150.

In step S701, the input value computing unit 150 receives input of the attack path and the attack accomplishment conditions from the attack path analyzing unit 140.

In step S702, the input value computing unit 150 calculates a possible value or a range of a possible value which is held at the input position while the input information for the program satisfies the attack accomplishment conditions, from the attack path, as the attack information. For example, a value to be input in "input B" which satisfies "condition C" which is always satisfied on the path from "condition C" to "processing E" in FIG. 6 or a range of the value to be input becomes the attack information. In this manner, because the attack information for the program which is to be evaluated and for which the attack accomplishment conditions are satisfied is information with which assets which are desired to be preserved cannot be preserved, the attack information indicates an input value for attacking the program which is to be evaluated, and is an input value which attacks vulnerability of the program.

In step S703, the input value computing unit 150 outputs the attack information calculated in step S702 to the packet generating unit 160. Further, in step S703, the input value computing unit 150 can also output the attack information calculated in step S702 to an external apparatus.

FIG. 7B illustrates a schematic diagram of operation in which the input value computing unit 150 calculates an input value with which the attack accomplishment conditions are always satisfied in the path from the attack determination position to the input position on the source code, as the attack information.

Figure 8A:
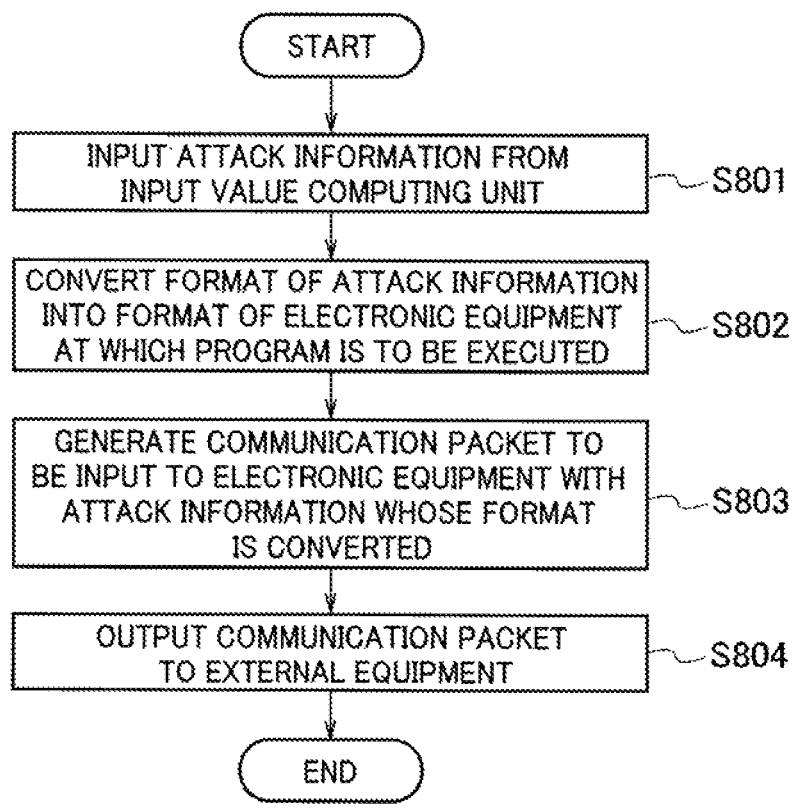
FIG. 8A is a view illustrating an example of processing of a packet generating unit according to the embodiment.
Figure 8B:
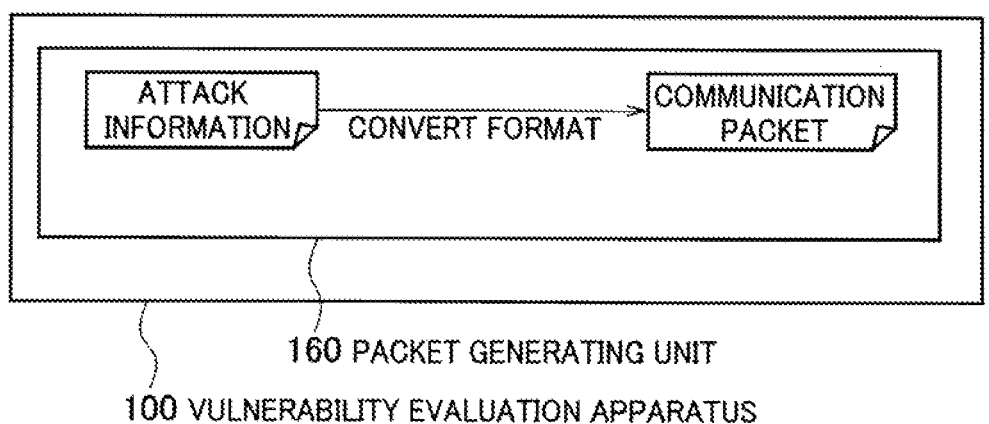
FIG. 8B is a schematic diagram illustrating part of the processing of the packet generating unit according to the embodiment.

FIG. 8A illustrates an example of processing flow of the packet generating unit 160, and FIG. 8B illustrates a schematic diagram of part of the processing flow of the packet generating unit 160.

In step S801, the packet generating unit 160 receives input of the attack information from the input value computing unit 150.

In step S802, the packet generating unit 160 converts a format of the attack information to a format which complies with communication protocol of electronic equipment to input the attack information to the electronic equipment at which the program which is to be evaluated is implemented.

In step S803, the packet generating unit 160 generates a communication packet which complies with communication protocol of the electronic equipment at which the program which is to be evaluated is implemented from the attack information whose format has been converted. By this means, it becomes possible to generate a test pattern which can be directly transmitted to the electronic equipment with the communication packet via an interface of the electronic equipment at which the program which is to be evaluated is implemented.

In step S804, the packet generating unit 160 outputs the generated communication packet to external equipment. It becomes possible to input the generated communication packet to the electronic equipment at which the program which is to be evaluated is implemented from the external equipment as necessary and confirm that a state becomes a state where assets which are desired to be preserved cannot be preserved. Further, there is also a case where a state becomes a state where assets which are desired to be preserved are preserved as a result of the electronic equipment filtering the attack information indicated by the communication packet. For example, in a case where an ID unique to the electronic equipment is included in the communication protocol, there is also a case where the attack information is not input to the electronic equipment as a result of the attack information corresponding to the unique ID being filtered. In this manner, it becomes possible to confirm whether or not a state becomes a state where assets which are desired to be preserved are preserved by performing communication with the electronic equipment with the communication packet corresponding to the protocol of the electronic equipment at which the program which is to be evaluated is implemented.

Figure 9A:
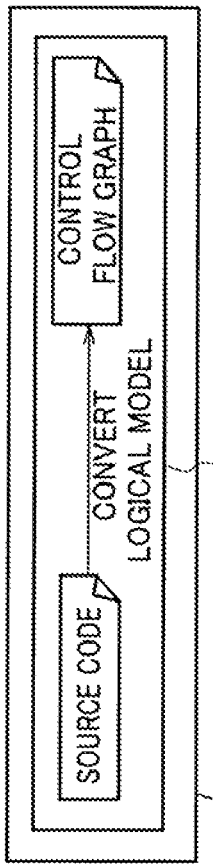
FIG. 9A is a schematic diagram illustrating part of processing of a source code structure analyzing unit according to the embodiment.
Figure 9B:
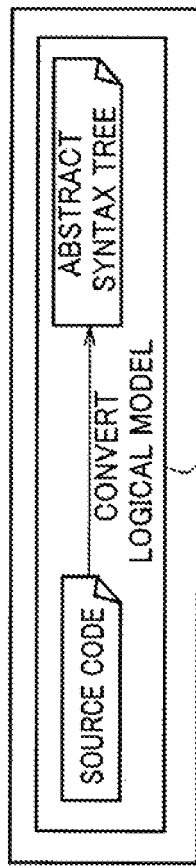
FIG. 9B is a schematic diagram illustrating part of the processing of the source code structure analyzing unit according to the embodiment.
Figure 9C:
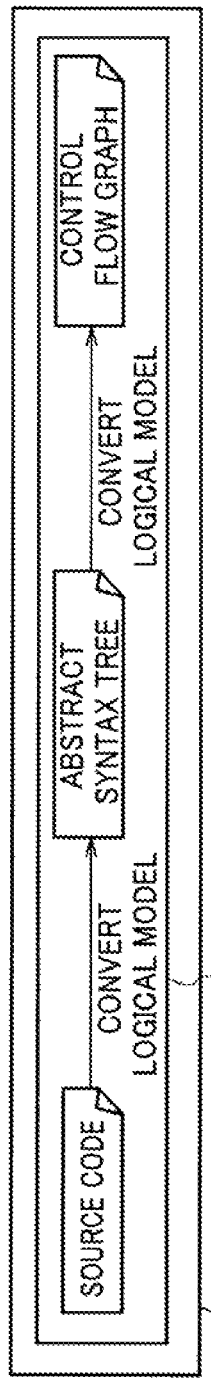
FIG. 9C is a schematic diagram illustrating part of the processing of the source code structure analyzing unit according to the embodiment.

FIG. 9A to FIG. 9C are views schematically illustrating a configuration where the source code structure analyzing unit 170 converts the source code of the program which is to be evaluated into a control flow graph or an abstract syntax tree in the vulnerability evaluation apparatus 100 in the present embodiment in FIG. 1.

In a case where the attack path analyzing unit 140 executes retrospective analysis, because understanding processing to be performed on the source code, such as compiling processing to be performed on the source code occurs in each case, there is a case where it is necessary to improve execution speed. In such a case, by converting the source code of the program which is to be evaluated into a control flow graph or an abstract syntax tree which is one type of a logical model, it becomes possible to execute retrospective analysis in the control flow graph or the abstract syntax tree.

While the control flow graph is logical flow in which commands to be sequentially executed in the program are organized as nodes and which is expressed mainly using branch, merge and loop, because the control flow graph is a known technology, details thereof will not be described here.

Further, while the abstract syntax tree is a tree constructed using operators and keywords as knots and using components such as operands as subtrees, because the abstract syntax tree is a known technology, details thereof will not be described here.

FIG. 9A is a view schematically illustrating a configuration where the source code structure analyzing unit 170 converts the source code of the program which is to be evaluated into a control flow graph.

FIG. 9B is a view schematically illustrating a configuration where the source code structure analyzing unit 170 converts the source code of the program which is to be evaluated into an abstract syntax tree.

FIG. 9B is a view schematically illustrating a configuration in which the source code structure analyzing unit 170 converts the source code of the program which is to be evaluated into an abstract syntax tree and converts the abstract syntax tree into a control flow graph. In this manner, the source code structure analyzing unit 170 can convert the source code into different types of logical models in a stepwise manner such that the source code structure analyzing unit 170 converts the source code into the abstract syntax tree and converts the abstract syntax tree into the control flow graph, to realize efficient conversion.

Note that, in a case where the source code structure analyzing unit 170 converts the source code of the program which is to be evaluated into the logical model, the attack determination position designating unit 130 designates the attack determination position on a path of the logical model. Further, the input position designating unit 120 designates the input position on the path of the logical model, and the attack path analyzing unit 140 specifies the attack accomplishment conditions in processing of the logical model.

Note that processing procedure illustrated in an example of flowcharts of operation in FIG. 2A, FIG. 3A, FIG. 4A, FIG. 5A, FIG. 7A and FIG. 8A at the vulnerability evaluation apparatus 100 is processed as follows. In other words, a central processing unit (CPU) executes each kind of processing in accordance with a program stored in a read only memory (ROM) of a computer provided at the vulnerability evaluation apparatus 100.

Note that part or all of the above-described processing procedure is executed by hardware such as, for example, a digital signal processor (DSP) and an application specific integrated circuit (ASIC). However, in the present embodiment, a case has been described where the CPU performs execution in accordance with the program in the ROM.

As described above, according to the present embodiment, because a state where assets to be preserved are preserved is expressed with a logical formula, it becomes possible to find vulnerability while limiting cases to a case where a state where assets to be preserved are preserved is infringed. Further, because a state where assets to be preserved are preserved is only required to be indicated with a logical formula which indicates a state directly leading to processing which is not preferable to occur in the program, it becomes possible to indicate the logical formula even without knowledge regarding security.

Comparative Example

In related art, there has been a configuration for exhaustively confirming every path as to a fact that the program which is to be evaluated does not reach a specific state.

However, it is extremely redundant to exhaustively confirm every path, and a large amount of calculation resources and calculation time is wasted.

However, because the vulnerability evaluation apparatus 100 of the present embodiment confirms vulnerability for a path between the attack determination position and the input position, it becomes possible to exclude a path on flow including processing of the program which is to be evaluated for which it is not necessary to perform confirmation. As a result, a large amount of calculation resources and calculation time is not wasted, so that it becomes possible to provide efficient vulnerability evaluation means.

Further, in related art, there has been a configuration where failure occurrence condition and a matching degree for characteristics of unauthorized commands and unauthorized data are stochastically calculated, and vulnerability of the program which is to be evaluated is evaluated. However, in this configuration, because vulnerability of the program which is to be evaluated is stochastically evaluated, there is no certainty and completeness in vulnerability evaluation.

However, in the vulnerability evaluation apparatus 100 of the present embodiment, because vulnerability is confirmed by the attack path analyzing unit 140 on the basis of the attack accomplishment conditions for all paths between the attack determination position and the input position, a configuration is achieved which provides certainty and completeness in vulnerability evaluation. Therefore, omission in detection does not occur.

Further, in related art, there has been a configuration where a test case which is effective for the program which is to be evaluated is selected using a test case which has been prepared in advance. However, in this configuration, because it is impossible to cope with an attack using means which is beyond a range prepared in advance, there is a case where omission in detection for vulnerability may occur.

However, at the vulnerability evaluation apparatus 100 of the present embodiment, it becomes possible to analyze the source code itself and extract the attack path by attack path analyzing unit 140, so that it becomes possible to derive all input values which can utilize the attack path by the input value computing unit 150. Further, because it is possible to generate a specific test case by the packet generating unit 160, it is not necessary to prepare a test case which should be selected, in advance.

Further, in related art, there has been a configuration where, in a case where a path of the program which is to be evaluated is selected, the path is selected under the condition that there is relationship with a keyword designated in advance. However, there is a case where the same keyword has different meanings in the program which is to be evaluated. Further, there is a case where different keywords have the same information in the program which is to be evaluated. In this manner, if the path is selected under the condition that there is relationship with the keyword, there is a possibility that a case may occur where selection of a path is imperfect, and there is a case where omission in detection of vulnerability occurs. Further, in related art, a configuration for preventing transition conditions of state transition in a specific state from overlapping with each other has been provided. However, because there can be a possibility that an attack path may exist in program flow in a case where parameters irrelevant to the transition conditions in the specific state are different, there is a case where omission in detection of vulnerability occurs.

However, at the vulnerability evaluation apparatus 100 of the present embodiment, because analysis is performed by the attack path analyzing unit 140 on all attack paths other than paths for which it is not necessary to preform confirmation, a configuration which realizes certainty and completeness in vulnerability evaluation is realized. Therefore, omission in detection does not occur.

Further, in related art, occurrence of a bug is determined by confirming reach to an abnormal point in the program which is to be evaluated. However, in security in which vulnerability is evaluated, because it is necessary to also detect occurrence of abnormal operation in a normal point of the program, there is a case where omission in detection of vulnerability occurs in the determination.

However, at the vulnerability evaluation apparatus 100 of the present embodiment, determination is performed at the attack determination position designated by the attack determination position designating unit 130, and the attack determination position is a position which can be designated in any position in the program. Therefore, at the vulnerability evaluation apparatus 100 of the present embodiment, it is possible to detect vulnerability on a normal path not as exception processing of an abnormal point in the program.

Characteristics of the vulnerability evaluation apparatus 100 of the present embodiment will be described below.

A vulnerability evaluation apparatus 100 according to a first aspect of the disclosure which evaluates whether or not there is vulnerability in terms of information security of a program which is to be evaluated includes an input unit 110 that inputs information such as a source code of the program which is to be evaluated. The information includes information indicating assets which are desired to be preserved and an attack accomplishment condition which is a condition where the assets which are desired to be preserved are not preserved, indicated using a notation method of the source code. In addition, the information includes information indicating an attack determination position which is a position at which whether the condition where the assets which are desired to be preserved are not preserved is satisfied can be determined, and input information for the program. Further, the vulnerability evaluation apparatus 100 includes an input position designating unit 120 that designates an input position indicating a position at which the input information for the program is input in the source code. Further, the vulnerability evaluation apparatus 100 includes an attack determination position designating unit 130 that designates the attack determination position at which whether the condition where the assets which are desired to be preserved are not preserved is satisfied can be determined, in the source code from the information indicating the attack determination position. Further, the vulnerability evaluation apparatus 100 includes an attack path analyzing unit 140 that analyzes a path from the attack determination position to the input position in the source code and specify an attack path which is a path for which the attack accomplishment condition is satisfied from the path through specific processing at the attack determination position.

According to the configuration described above, it becomes possible to provide a specific method for confirming whether or not there is a possibility that a program may reach a specific inconvenient state due to unauthorized input.

The information of the vulnerability evaluation apparatus 100 according to a second aspect of the disclosure indicating the attack determination position at which whether the condition where the assets which are desired to be preserved are not preserved is satisfied can be determined includes information indicating specific processing indicated using the notation method of the source code and information indicating a position at which the specific processing is to be executed.

According to the above-described configuration, by setting the source code of the program which is to be evaluated as a target, it becomes possible to reliably perform retrospective analysis from the attack determination position to the input position. In other words, because it becomes possible to perform analysis while excluding paths which do not lead to the attack determination position and for which it is not necessary to perform confirmation, it becomes possible to provide efficient analysis means. Further, because analysis is performed on every path other than paths for which it is not necessary to perform confirmation, certainty and completeness in vulnerability evaluation are achieved, so that it is possible to suppress occurrence of omission in detection.

In the vulnerability evaluation apparatus 100 according to a third aspect of the disclosure, the specific processing includes at least one of processing of rewriting the assets which are desired to be preserved, or processing of making the assets which are desired to be preserved accessible from outside of an electronic apparatus at which the program is implemented.

According to the configuration described above, because a state where assets to be preserved are not preserved is expressed with a logical formula, it becomes possible to find vulnerability while limiting cases to a case where a state where assets to be preserved are preserved is infringed.

In the vulnerability evaluation apparatus 100 according to a fourth aspect of the disclosure, the input information for the program is information which directly or indirectly indicates information to be used for establishing the attack path, indicated using the notation method of the source code.

According to the above-described configuration, by designating input information for the program as information to be used for establishing an attack path, it becomes possible to fulfill certainty and completeness in vulnerability evaluation and suppress occurrence of omission in detection.

The vulnerability evaluation apparatus 100 according to a fifth aspect of the disclosure, further includes an input value computing unit 150 that calculates information expressing a value of input information to be input to the program or a range of the value, which is to be utilized for establishing the attack path, as attack information.

According to the configuration described above, it becomes possible to analyze the source code itself and extract the attack path by attack path analyzing unit 140, so that it becomes possible to derive all input values which can utilize the attack path by the input value computing unit 150. In other words, the input value computing unit 150 can exhaustively generate input information which attacks vulnerability of the program which is to be evaluated.

The input value computing unit 150 of the vulnerability evaluation apparatus 100 according to a sixth aspect of the disclosure calculates information which satisfies branch conditions for establishing an attack path as attack information in branch processing of the attack path.

According to the above-described configuration, the input value computing unit 150 can exhaustively generate input information which attacks vulnerability of the program which is to be evaluated.

The vulnerability evaluation apparatus 100 according to a seventh aspect of the disclosure further includes the packet generating unit 160 that converts a format of the attack information into a format which complies with communication protocol to be used at an electronic apparatus at which the program which is to be evaluated is implemented. Further, the packet generating unit 160 generates a communication packet which includes the converted attack information and which can be transmitted to the electronic apparatus.

According to the above-described configuration, it becomes possible to generate a test pattern which can be directly transmitted to electronic equipment with the communication packet via an interface of the electronic equipment at which the program which is to be evaluated is implemented.

The vulnerability evaluation apparatus 100 according to an eighth aspect of the disclosure further includes the source code structure analyzing unit 170 that analyzes the source code of the program which is to be evaluated and express processing procedure and processing content of processing indicated by the source code with a logical model.

In the vulnerability evaluation apparatus 100 according to a ninth aspect of the disclosure, the logical model is a control flow graph or an abstract syntax tree.

In a case where the attack path analyzing unit 140 executes retrospective analysis, because understanding processing to be performed on the source code, such as compiling processing to be performed on the source code occurs in each case, there is a case where it is necessary to improve execution speed. According to the configuration described above, by converting the source code of the program which is to be evaluated into a control flow graph or an abstract syntax tree which is one type of a logical model, it becomes possible to execute fast retrospective analysis in the control flow graph or the abstract syntax tree. In other words, the source code structure analyzing unit 170 can speed up processing time for vulnerability evaluation of the program which is to be evaluated.

The attack determination position designating unit 130 of the vulnerability evaluation apparatus 100 according to a tenth aspect of the disclosure designates the attack determination position on a path of the logical model, and the input position designating unit 120 designates the input position on the path of the logical model. The attack path analyzing unit 140 specifies the attack accomplishment conditions in processing of the logical model.

According to the above-described configuration, the vulnerability evaluation apparatus 100 can speed up processing time for vulnerability evaluation of the program which is to be evaluated.

As described above, according to the present embodiment, because a state where assets to be preserved are preserved is expressed with a logical formula, it becomes possible to find vulnerability while limiting cases to a case where a state where assets to be preserved are preserved is infringed. Further, because a state where assets to be preserved are preserved is only required to be indicated with a logical formula which indicates a state directly leading to processing which is not preferable to occur in the program, it becomes possible to indicate the logical formula even without knowledge regarding security.

While various examples have been described above, part or all of these examples may be combined to make a new example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vulnerability evaluation apparatus comprising:
a memory storing one or more instructions; and
a processor configured to execute the one or more instructions to:
receive a source code of a program to be evaluated, first information indicating assets which are desired to be preserved, second information indicating and an attack accomplishment condition when the assets to be preserved are not preserved, third information indicating an attack determination position at which the attack accomplishment condition when the assets to be preserved are not preserved is satisfied, and fourth information, which is input information for the program indicating, a notation method of the source code;
designate an input position at which the fourth information for the program is input in the source code;
in the source code based on the third information indicating the attack determination position; and
analyze a path from the attack determination position to the input position in the source code and specify an attack path for which the attack accomplishment condition is satisfied from the path through specific processing at the attack determination position,
wherein the specific processing comprises retrospectively deriving the path for which the attack accomplishment conditions are always satisfied on the source code from the attack determination position.

2. The vulnerability evaluation apparatus according to claim 1, wherein the third information indicating the attack determination position includes information indicating specific processing indicated using the notation method of the source code and information indicating a position at which the specific processing is to be executed.

3. The vulnerability evaluation apparatus according to claim 1, wherein
the specific processing includes at least one of processing of rewriting the assets which are desired to be preserved, or processing of making the assets which are desired to be preserved accessible from outside of an electronic apparatus at which the program is implemented.

4. The vulnerability evaluation apparatus according to claim 1, wherein the fourth information directly or indirectly indicates information to be used for establishing the attack path, indicated using the notation method of the source code.

5. The vulnerability evaluation apparatus according to claim 1, wherein the processor is further configured to:
calculate fifth information expressing a value of input information to be input to the program or a range of the value, which is to be utilized for establishing the attack path, as attack information.

6. The vulnerability evaluation apparatus according to claim 5, wherein the processor is further configured to:
calculate sixth information which satisfies a branch condition for establishing the attack path as the attack information in branch processing of the attack path.

7. The vulnerability evaluation apparatus according to claim 5, wherein the processor is further configured to:
convert a format of the attack information into a format which complies with communication protocol to be used at an electronic apparatus at which the program which is to be evaluated is implemented and generate a communication packet which includes the converted attack information and which can be transmitted to the electronic apparatus.

8. The vulnerability evaluation apparatus according to claim 1, wherein the processor is further configured to implement:
a source code structure analyzing unit configured to analyze the source code of the program which is to be evaluated and express processing procedure and processing content of processing indicated by the source code with a logical model.

9. The vulnerability evaluation apparatus according to claim 8, wherein
the logical model is a control flow graph or an abstract syntax tree.

10. The vulnerability evaluation apparatus according to claim 8, wherein the processor is further configured to:
designate the attack determination position on a path of the logical model,
designate the input position on a path of the logical model, and
specify the attack accomplishment condition in processing of the logical model.

* * * * *